(12) United States Patent
Yasutomo et al.

(10) Patent No.: US 7,609,287 B2
(45) Date of Patent: Oct. 27, 2009

(54) TWO-WAY BROADCASTING SYSTEM ALLOWING A VIEWER TO PRODUCE AND SEND A PROGRAM

(75) Inventors: Yuichi Yasutomo, Nagoya (JP); Kazuhiro Omura, Ama-gun (JP); Kazuyuki Shudo, Tsukuba (JP); Tomonari Sonoda, Nishitokyo (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 1126 days.

(21) Appl. No.: 11/005,049

(22) Filed: Dec. 7, 2004

(65) Prior Publication Data
US 2005/0151834 A1 Jul. 14, 2005

(30) Foreign Application Priority Data
Dec. 25, 2003 (JP) ............................. 2003-431415

(51) Int. Cl.
*H04N 7/14* (2006.01)
(52) U.S. Cl. ...................................... 348/14.01; 725/45
(58) Field of Classification Search .... 348/14.01–14.07
See application file for complete search history.

(56) References Cited

U.S. PATENT DOCUMENTS 5,236,199 A * 8/1993 Thompson, Jr. .......... 348/14.05
5,303,042 A * 4/1994 Lewis et al. ............... 348/14.01
2004/0064510 A1 4/2004 Ooi et al.
2006/0048186 A1 * 3/2006 Alterman ................. 348/14.01

FOREIGN PATENT DOCUMENTS

| JP | 11-27649 A | 1/1999 |
|---|---|---|
| JP | A-11-306199 | 11/1999 |
| JP | 2002-369175 A | 12/2002 |
| JP | A-2003-296239 | 10/2003 |

* cited by examiner

*Primary Examiner*—Curtis Kuntz
*Assistant Examiner*—Maria El-Zoobi
(74) *Attorney, Agent, or Firm*—Oliff & Berridge, PLC

(57) ABSTRACT

A program broadcasting system is provided with: a material server; a plurality of communication terminal apparatuses; and an information management server connected through a communication network. The material server comprises a material DB which accumulates material composing a program. The communication terminal apparatus comprises a program progress table and a HDD which accumulates the material. The information management server comprises a material index list DB which stores contents of the material corresponding to the material server or the communication terminal apparatus, and a program DB which stores the program progress table corresponding to the communication terminal apparatus. In accordance with the program progress table, the information management server instructs the material server to send the material, and the communication terminal apparatus to send or receive the material. The communication terminal apparatus composes the program by combines the received materials and the accumulated material.

3 Claims, 15 Drawing Sheets

BLOCK DIAGRAM SHOWING CONFIGURATION OF
PARTICIPATION PROGRAM COMMUNICATION APPARATUS

DIAGRAM EXPLAINING GENERAL FUNCTION AND INFORMATION OF APPARATUSES COMPOSING SYSTEM

BLOCK DIAGRAM OF FUNCTION OF MATERIAL SERVER

FIG. 7 FLOWCHART OF PARTICIPATION PROGRAM COMMUNICATION APPARATUS

EXEMPLARY WINDOW DISPLAYED AT TIME WHEN OPERATION OF PARTICIPATION PROGRAM COMMUNICATION APPARATUS STARTS

EXEMPLARY WINDOW DISPLAYED AT TIME WHEN PROGRAM PROGRESS TABLE IS GENERATED BY PARTICIPATION PROGRAM COMMUNICATION APPARATUS

EXEMPLARY COMPOSITION OF PROGRAM PROGRESS TABLE

COMPOSITION OF REGISTERED PARTICIPANT LIST

TWO-WAY BROADCASTING SYSTEM ALLOWING A VIEWER TO PRODUCE AND SEND A PROGRAM

BACKGROUND OF THE INVENTION

1. Field of the Invention

The present invention relates to a two-way broadcasting system allowing a viewer to produce and send a program and a program broadcasting system, and more particularly to a two-way broadcasting system allowing a program sender to easily change the composition of a program and enabling a viewer to easily participate in a program while receiving the program.

2. Related Art

As a TV program, audience participation programs such as a quiz show or a karaoke contest show are known. Apart from viewing a program, a viewer of such programs has a desire to appear on the programs as a participant; these programs stand on satisfaction of the desire. In addition, among viewers having the same taste and interest, there are many requests to produce and broadcast original programs and to participate in them.

To participate in these programs, however, a viewer must go to a broadcasting station or a program broadcast relay site. Therefore, a viewer cannot easily participate while viewing the program. Moreover, regarding program production, a large sum of expenses is required for preparations, etc. of a broadcasting station or program broadcast relay site, thus making it difficult for a viewer to easily produce audience participation programs.

As means for solving these problems, there may be listed Japanese Patent Application Laid-Open Publication No. 2002-369175 and Japanese Patent Application Laid-Open Publication No. Hei-11-27649, for example.

The invention disclosed in Japanese Patent Application Laid-Open Publication No. 2002-369175 is a viewer participation program production system in which a receiver set includes a video/audio encoder unit which encodes video and audio signals of a viewer picked up by a connected camera/microphone 7 and the encoded signals are sent to a broadcasting station via a two-way communication controller 6 while the broadcasting station side decodes the encoded video/audio data transmitted from the viewer by use of a viewer video receiving unit 10 to send the resulting signals to a control room 12 which controls transmission of broadcast video/audio programs, so that video/audio signals from the viewer are synthesized with studio video/audio signals, etc.

The invention disclosed in Japanese Patent Application Laid-Open Publication No. Hei-11-27649 is a TV broadcasting system and a program production method used therein. In this method, a broadcasting station is provided with a program production unit for storing program contents producing materials and program contents and distributes the program contents producing materials to viewers via at least one of a TV channel and a communication channel, so that viewers can produce program contents using the program contents producing materials distributed from the broadcasting station and send the resulting program contents to the broadcasting station via the communication channel.

According to these conventional techniques, however, a dedicated apparatus such as a broadcasting station is required for producing a program. Furthermore, in the program production method used by a viewer, which is disclosed in Patent Document 2, while a program can be produced by a viewer, program contents distributed from a broadcasting station are needed and broadcasting facilities are further required for sending a produced program. Consequently, it is difficult for a viewer to produce and send an original viewer participation program.

In other words, there has not been realized a two-way broadcasting system allowing a viewer to originally produce and send a viewer participation interactive program and to easily participate in the program.

SUMMARY OF THE INVENTION

In view of the above-described circumstances, an object of the present invention is to provide a viewer participation program broadcasting system for implementing a broadcast by employing an audio and video communication system in which each viewer connects a viewer participation program communication apparatus to a two-way communication network and video and audio signals from another viewer in addition to a self-made image can be mutually viewed by a multiwindow function on a display of the viewer participation program communication apparatus, the viewer participation program communication apparatus, a management server comprising the viewer participation program, and a material server comprising the viewer participation program.

The present invention will be described below. Although reference numerals in the accompanying drawings will be accessorily written as parenthetic numerals for descriptive convenience, the present invention is not limited to the illustrated features.

The above object of the present invention can be achieved by the first aspect of a viewer participation program broadcasting system, the viewer participation program broadcasting system implementing a broadcast by employing an audio and video communication system in which each viewer connects a communication terminal apparatus (14) to a two-way communication network (10) and video and audio signals from another viewer in addition to a self-made image can be mutually viewed by a multiwindow function on a display of the communication terminal apparatus (14), wherein materials which compose a program are stored in a plurality of communication terminal apparatuses (14) or a material providing server (18) each connected to one another by use of the network, and the materials are sent to another communication terminal apparatus (14) in accordance with progress of the program so that the program is composed by combining the materials received from another communication terminal apparatus (14) or the material providing server (18) by use of the communication terminal apparatus (14) which receives the program. Accordingly, the viewer participation program broadcasting system does not need any specific equipment for broadcasting a program.

In the second aspect of the viewer participation program broadcasting system of the present invention, in addition to the first aspect, each viewer can become an information sender by opening a broadcasting station, and the information sender defines the program by use of a program progress table which is generated at a time when the broadcasting station is opened, and distributes the program progress table to a communication terminal apparatus (14) which requests viewing of the program so that video and audio signals of materials received according to the program progress table are shifted, thereby composing the program. Accordingly, the viewer participation program broadcasting system enables the program to be easily composed.

In the third aspect of the viewer participation program broadcasting system of the present invention, in addition to the second aspect, the information sender can change progress of the program by changing the program progress table while the program is on air and then distributing the resulting program progress table to a program viewer. Accordingly, the viewer participation program broadcasting system enables the program to be easily changed while the program is on air.

In the fourth aspect of the viewer participation program broadcasting system of the present invention, in addition to the third aspect, the information sender can get the program viewer to participate in the program by changing the program progress table while the program is on air. Accordingly, the viewer participation program broadcasting system enables the program viewer to easily participate in the program.

In the fifth aspect of the viewer participation program broadcasting system of the present invention, in addition to the third aspect, the program viewer can obtain detailed information of materials which compose the program by selecting the materials while the program is on air and process the materials. Accordingly, the viewer participation program broadcasting system enables the program viewer to be easily changed the program in accordance with the preferences of the program viewer.

The above object of the present invention can be achieved by a program broadcasting system provided with: a material server (18); a plurality of communication terminal apparatuses (14, 14a, 14b, 14c); and an information management server (12) connected each other through a two-way communication network (10), the material server (18) comprising: a first storage device (206) which accumulates material composing a program; the communication terminal apparatus (14, 14a, 14b, 14c) comprising: a display device (36); a program progress table (200, 200a, 200b); and a second storage device (28) which accumulates the material, and the information management server (12) comprising a material index list database (203) which stores contents of the material corresponding to the material server (18) or the communication terminal apparatus (14, 14a, 14b, 14c), and a program database (201) which stores the program progress table (200) corresponding to the communication terminal apparatus (14). The information management server (12), in accordance with progress of the program indicated in the program progress table (200, 200a, 200b), instructs the material server (18) to send the material, and the communication terminal apparatus (14, 14a, 14b, 14c) to send or receive the material, and the communication terminal apparatus (14, 14a, 14b, 14c), in accordance with the progress of the program, composes the program by combines the received materials and the accumulated material and displays the program on the display device (36).

In the one aspect of the program broadcasting system of the present invention, further provided with a routing unit (15), the plurality of the communication terminal apparatuses (14, 14a, 14b, 14c) connect to the communication network (10) through the routing unit (15).

In another aspect of the program broadcasting system of the present invention, the communication terminal apparatus is a portable information device (20), and connects the communication network (10) through a base station (16).

The above object of the present invention can be achieved by a communication terminal apparatus (14, 14a, 14b, 14c) of a program broadcasting system provided with: a material server (18); a plurality of the communication terminal apparatuses (14, 14a, 14b, 14c); and an information management server (12) connected each other through a two-way communication network (10), the material server (18) comprising: a first storage device (206) which accumulates material composing a program; the communication terminal apparatus (14, 14a, 14b, 14c) comprising: a display device (36); a program progress table (200, 200a, 200b); and a second storage device (28) which accumulates the material, and the information management server (12) comprising a material index list database (203) which stores contents of the material corresponding to the material server (18) or the communication terminal apparatus (14, 14a, 14b, 14c), and a program database (201) which stores the program progress table (200) corresponding to the communication terminal apparatus (14). The information management server (12) instructing the material server (18) to send the material, and the communication terminal apparatus (14, 14a, 14b, 14c) to send or receive the material, in accordance with progress of the program indicated in the program progress table (200, 200a, 200b). The communication terminal apparatus (14, 14a, 14b, 14c) composes the program by combines the received materials and the accumulated material and displays the program on the display device (36), in accordance with the progress of the program.

As mentioned above, according to the viewer participation program broadcasting system claimed in claim 1, since each viewer can connect a communication terminal apparatus (14) to a two-way communication network (10), mutually view video and audio signals from another viewer in addition to a self-made image by a multiwindow function on a display of the communication terminal apparatus (14), obtain materials which compose a program from a plurality of communication terminal apparatuses (14) or a material providing server (18) each connected to one another by use of the network, compose the program by combining the materials received from another communication terminal apparatus (14) or the material providing server (18) by use of the communication terminal apparatus (14) which receives the program, the viewer participation program broadcasting system enables its user to easily create or send a viewer participation program.

According to the viewer participation program broadcasting system claimed in claim 2, since a user, who creates or sends a viewer participation program, defines the program by use of a program progress table and distributes the program progress table to a communication terminal apparatus (14) which requests viewing of the program, the viewer participation program broadcasting system enables composition or progress of the program to be easily controlled on the communication terminal apparatus (14) which receives a program.

According to the viewer participation program broadcasting system claimed in claim 3, since the user, who creates or sends a viewer participation program, changes the program progress table and distributes the resulting program progress table to a program viewer while the program is on air, the progress of the program can be easily changed.

According to the viewer participation program broadcasting system claimed in claim 4, since the user, who creates or sends a viewer participation program, changes the program progress table while the program is on air, the viewer participation program broadcasting system enables a program viewer to easily participate in the program.

According to the viewer participation program broadcasting system claimed in claim 5, since the program viewer watches contents of the program progress table and selects materials which compose the program while the program is on air, the program viewer can obtain detailed information of the materials or process the materials.

As mentioned above, according to the program broadcasting system claimed in claim 6, since the information management server (12) instructs the material server (18) to send the material, and the communication terminal apparatus (14, 14a, 14b, 14c) to send or receive the material in accordance with progress of the program indicated in the program progress table (200, 200a, 200b), the program broadcasting system enables the communication terminal apparatus (14, 14a, 14b, 14c) to compose the program by combines the received materials and the accumulated material.

As mentioned above, according to the communication terminal apparatus (14) of the program broadcasting system claimed in claim 9, since the communication terminal apparatus (14) receives the material from the material server (18) or another communication terminal apparatus (14) in accordance with progress of the program indicated in the program progress table (200), the program broadcasting system enables its user to easily compose a program by combines the received materials and the accumulated material.

DESCRIPTION OF THE PREFERRED EMBODIMENTS

The present invention is a viewer participation program broadcasting system in which materials which compose a program are stored in a plurality of communication terminal apparatuses or a material providing server connected to a two-way communication network, the materials are sent to another communication terminal apparatus in accordance with the progress of the program, the materials are received from the other communication terminal apparatus or the material providing server, and the materials are combined on the communication terminal apparatus which receives the program, in the case that a broadcast is implemented by use of an audio and video communication system in which each viewer connects the communication terminal apparatus to the communication network and video and audio signals from another viewer in addition to a self-made image can be mutually viewed by a multiwindow function on a display of the communication terminal apparatus. The present invention, for example, does not need any specific broadcasting equipments and enables a two-way program broadcast.

EXAMPLES

Figure 1:
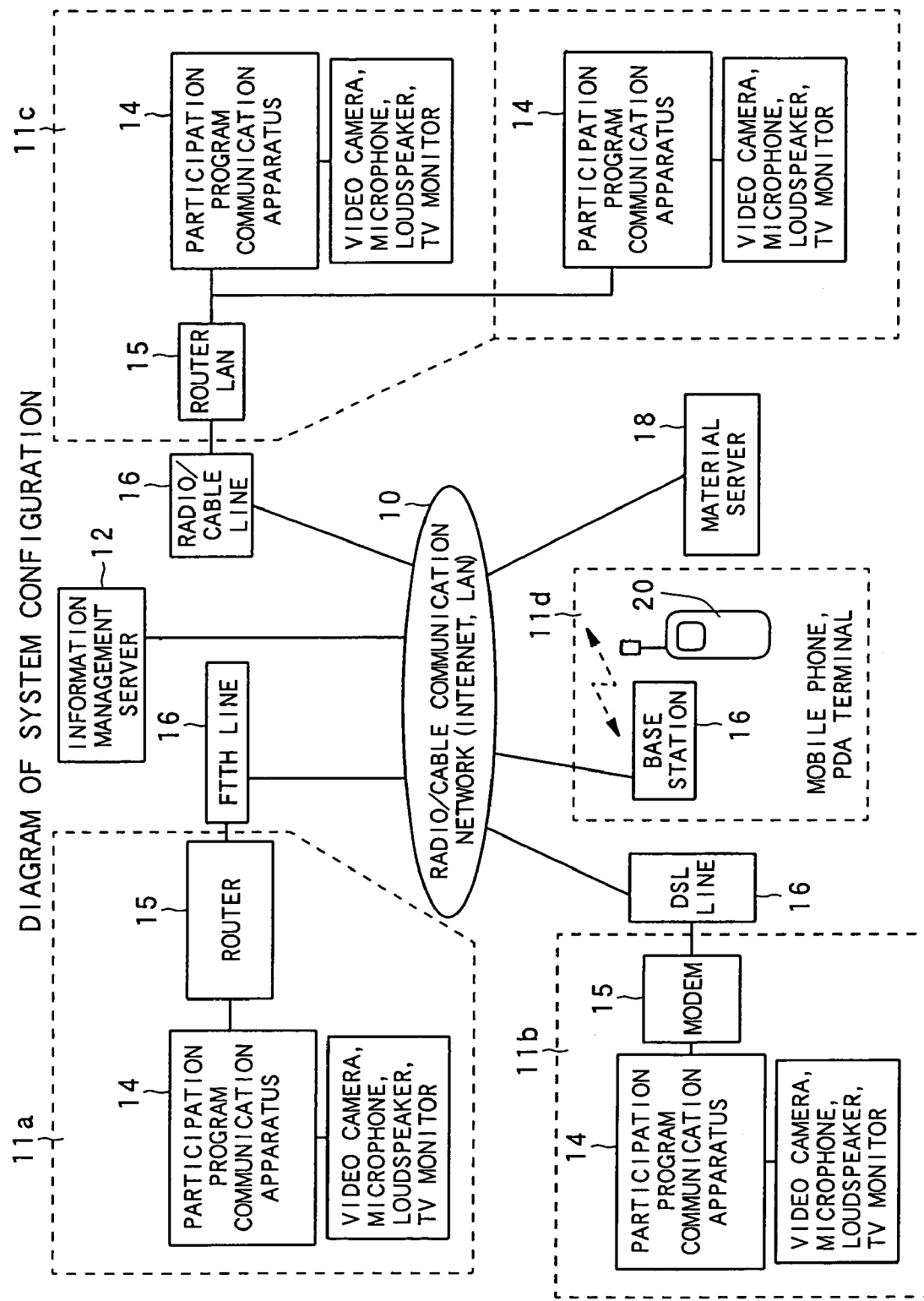
FIG. 1 is a diagram showing the configuration of a two-way broadcasting system according to the present invention, which allows a user to produce and send a program.

The present invention will be more fully understood from the following description of a preferred embodiment when reference is made to the accompanying drawings. FIG. 1 is a diagram showing the configuration of a system which implements the present invention. Referring to the drawing, a participation program communication apparatus 14 used in a two-way broadcasting system to which the present invention is applied and which allows a viewer to send a program, is connected to a communication network 10 via a broadband line 16 by use of a relay unit 15.

The communication network 10, which is a broadband network such as the Internet or a broadband LAN, enables information sent/received by a plurality of participation program communication apparatuses 14 to be exchanged. As the broadband line 16 used for connection to the communication network 10, a FTTH line, a DSL line, a radio/cable line or a mobile phone base station as a base station according to the present invention is utilized. In addition, in order to connect the participation program communication apparatus 14 to the broadband line 16, the relay unit 15 is provided. As the relay unit 15, a firewall router, a modem router or a LAN is employed.

Incidentally, for example, a communication network 10 according to this embodiment serves as a two-way communication network and a communication network according to the present invention, an information management server 12 according to this embodiment serves as an information management server according to the present invention, a participation program communication apparatus 14 according to this embodiment serves as a communication terminal apparatus according to the present invention, a relay unit 15 according to this embodiment serves as a routing unit according to the present invention, a material server 18 according to this embodiment serves as a material providing server and a material server according to the present invention, and a mobile phone 20 according to this embodiment serves as a portable information device according to the present invention. Another example of the portable information device according to the present invention is a PDA (Personal Digital Assistant).

Figure 2:
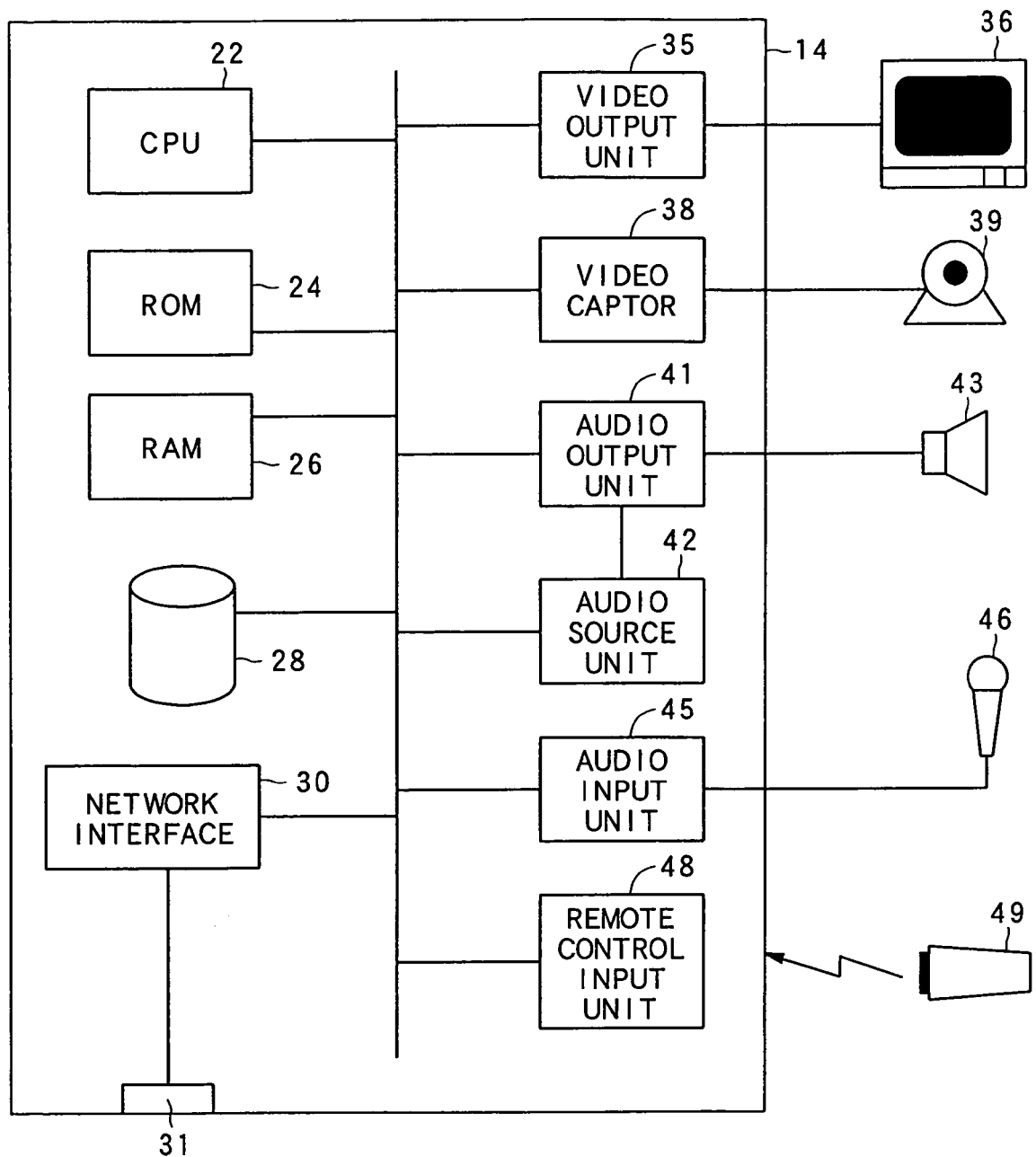
FIG. 2 is a block diagram showing the configuration of a participation program communication apparatus used in the two-way broadcasting system.

As shown in FIG. 2, the participation program communication apparatus 14 are connected to a video camera 39 and a microphone 46 for picking up images and voice of a user and further connected to a loudspeaker 43 and a TV monitor 36 for receiving program video and audio signals. A mobile phone 20 having the function of the participation program communication apparatus 14 can also be used for this purpose.

Incidentally, for example, a video camera 39 according to this embodiment serves as a video camera according to the present invention, a microphone 46 according to this embodiment serves as a microphone according to the present invention, a loudspeaker 43 according to this embodiment serves as a loudspeaker according to the present invention, and a TV monitor 36 according to this embodiment serves as a display and a display device according to the present invention.

Usage methods for the participation program communication apparatus 14 includes a business usage method 11a using a router as the relay unit 15, a home usage method 11b using a modem, a shop-complex usage method 11c using a router and a LAN, and an usage method 11d using a mobile phone and a mobile phone base station, each usage method being utilized by means of an appropriate network connection system.

Furthermore, in order to implement a two-way program communication system of the present invention enabling a viewer to send a program, an information management server 12 and a material server 18 are connected to the communication network 10.

Next, the configuration of the participation program communication apparatus 14 will be described with reference to FIG. 2. FIG. 2 is a block diagram showing the configuration of a participation program communication apparatus 14 used in the two-way broadcasting system allowing a viewer to send a program. The participation program communication apparatus 14 includes a CPU 22, a ROM 24, a RAM 26, an HDD 28, a network interface 30, and a connector 31, and in addition to these components, a video output unit 35 having a TV monitor 36, a video capture 38 having a video camera 39, an audio output unit 41 having a loudspeaker 43, an audio source unit 42 for playing music, an audio input unit 45 having a microphone 46, and a remote control input unit 48 for receiving various information and performing selecting operation by use of control signals from a remote controller 49.

Incidentally, for example, a CPU 22 according to this embodiment serves as a processing apparatus according to the present invention, a ROM 24 and a RAM 26 according to this embodiment serve as a memory according to the present invention, an HDD 28 according to this embodiment serves as a storage apparatus and a second storage device according to the present invention, and a network interface 30 according to this embodiment serves as a network connecting interface according to the present invention.

The network interface 30 shown in FIG. 2 is connected to the relay unit 15 shown in FIG. 1 through the connector 31 to send images and voice of a user picked up by the video camera 39 and the microphone 46 to the communication network 10 via the broadband line 16. At the same time the network interface 30 receives video and audio signals and then outputs the signals to the TV monitor 36 connected through the video output unit 35 and to the loudspeaker 43 connected through the audio output unit 41.

The CPU 22 interprets signals from the network interface 30, and reads music data from the HDD 28 as required, so that music is reproduced by the music source unit 42 and output to the loudspeaker 43 via the audio output unit 41.

Figure 3:
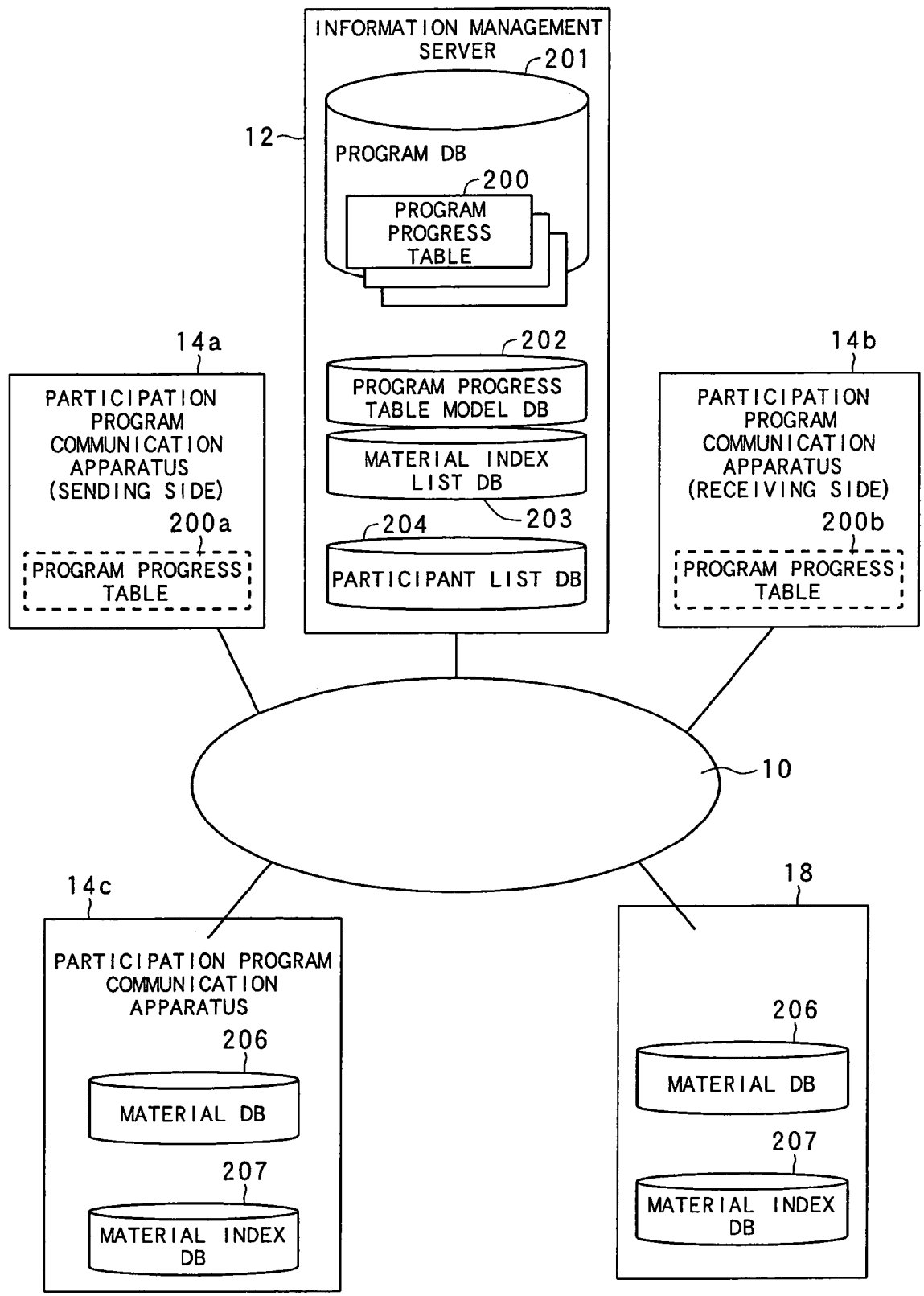
FIG. 3 is a diagram explaining a general function and information of apparatuses composing the two-way broadcasting system according to the present invention.

Next, a general function of apparatuses composing the system for implementing the present invention and information exchanged between the apparatuses will be described with reference to FIG. 3.

The participation program communication apparatus 14 is an apparatus used by a program sender as well as a receiver. When being used by a program sender, a participation program communication apparatus 14a generates a program progress table 200 for controlling the progress of a program and registers the table with a program DB (Data Base) 201 of the information management server 12. On the other hand, when being used by a program receiver, a participation program communication apparatus 14b obtains the program progress table 200 from the program DB 201 of the information management server 12, and when a program is received, the participation program communication apparatus 14b composes the program according to the obtained program progress table 200.

The information management server 12 is a server composed of a CPU, a ROM, a RAM, an HDD and a network interface, and includes the program DB 201 for storing the program progress table 200 registered by the participation program communication apparatus 14. The information management server 12 further includes: a program progress table model DB 202 for storing a model of the program progress table 200, which model is used when a program sender produces a program by use of the participation program communication apparatus 14; a material index list DB 203 for storing a material index list representing the location and the outline of a program material used at the time when the program progress table 200 is generated; and a participant list DB 204 for storing information on program receivers.

The material server 18 is a server composed of a CPU, a ROM, a RAM, an HDD and a network interface, and includes; a material DB 206 for storing video/audio materials used at the time when the participation program communication apparatus 14 composes a program; and a material index DB 207 for storing material index information indicating the name and the outline of the materials. When the video/audio materials are registered with the material DB 206, the material server 18 registers the material index information with the material index DB 207 and at the same time sends the material index information to the information management server 12 via the communication network 10. Then, the information management server 12 registers with the material index list DB 203 the material index information which is received along with identification information of the material server 18.

In addition, the participation program communication apparatus 14c may have the function of the material server 18, and video/audio materials provided by program participants can be utilized for producing a program.

Incidentally, for example, a program progress table 200 according to this embodiment serves as a program progress table according to the present invention, a program DB 201 according to this embodiment serves as a program database according to the present invention, a material index list DB 203 according to this embodiment serves as a material index list database according to the present invention, and a material DB 206 according to this embodiment serves as a first storage device according to the present invention.

Figure 5:
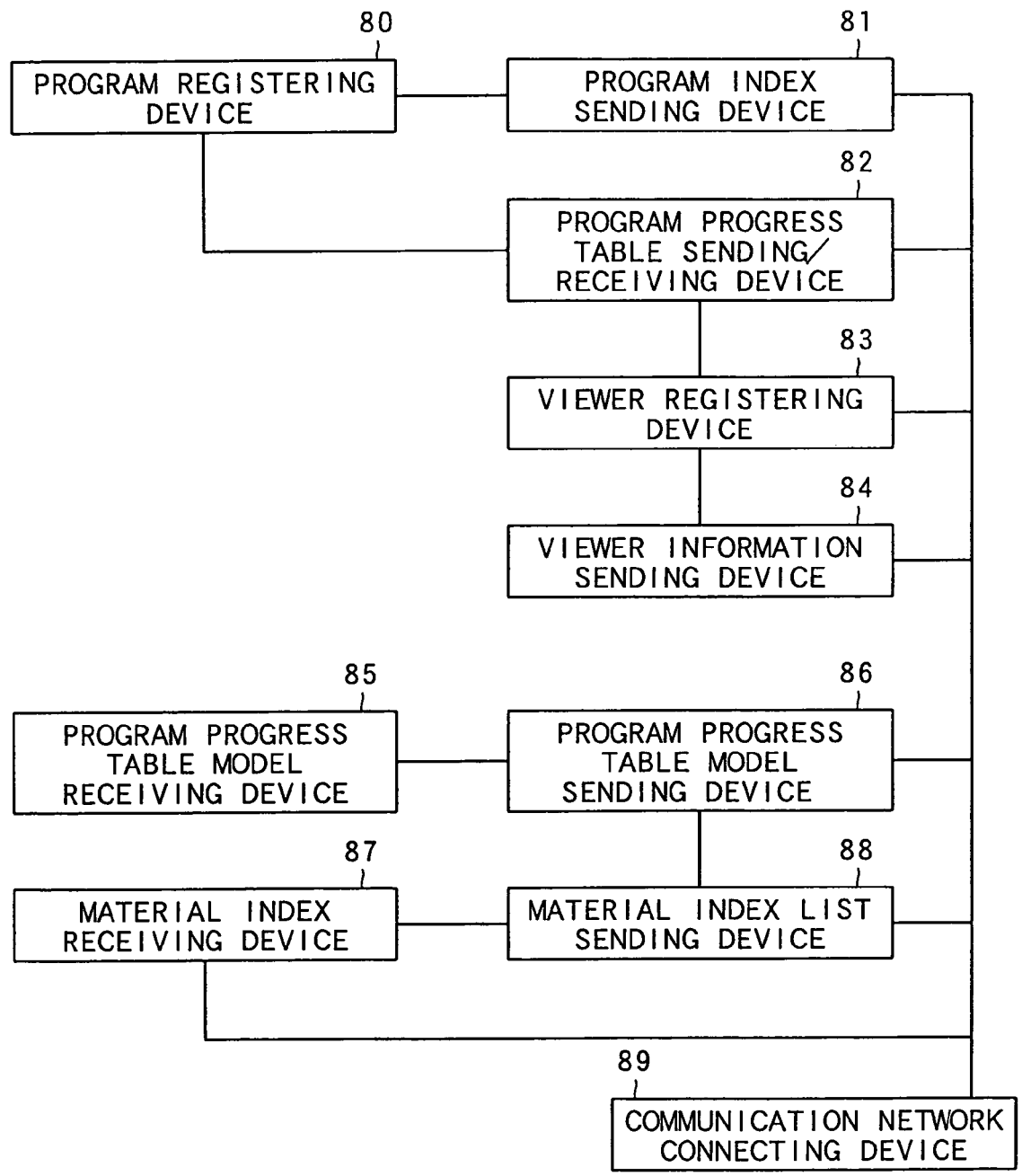
FIG. 5 is a block diagram of the function of an information management server used in the two-way broadcasting system according to the present invention.
Figure 6:
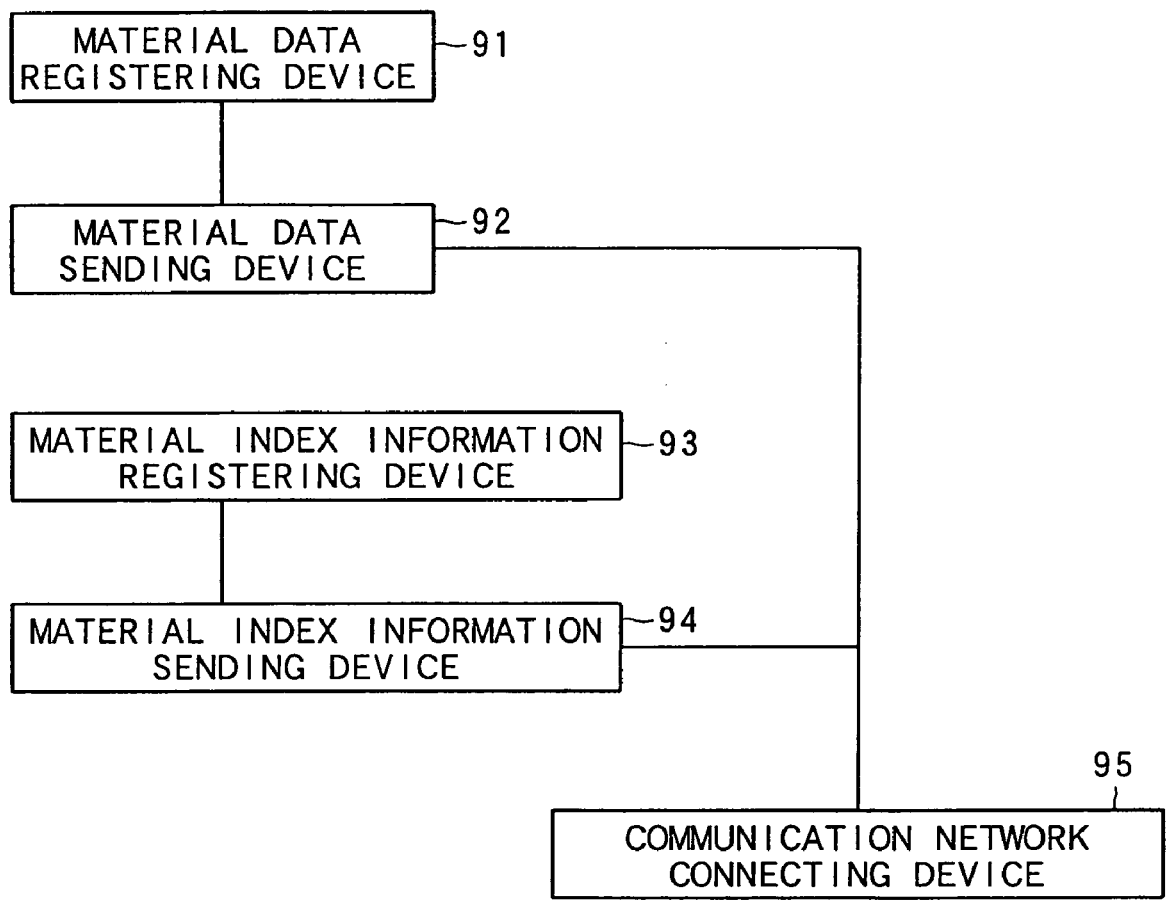
FIG. 6 is a block diagram of the function of a material server used in the two-way broadcasting system according to the present invention.

The details of the function of the apparatuses composing the system of the present invention will be described with reference to FIGS. 4, 5 and 6.

Figure 4:
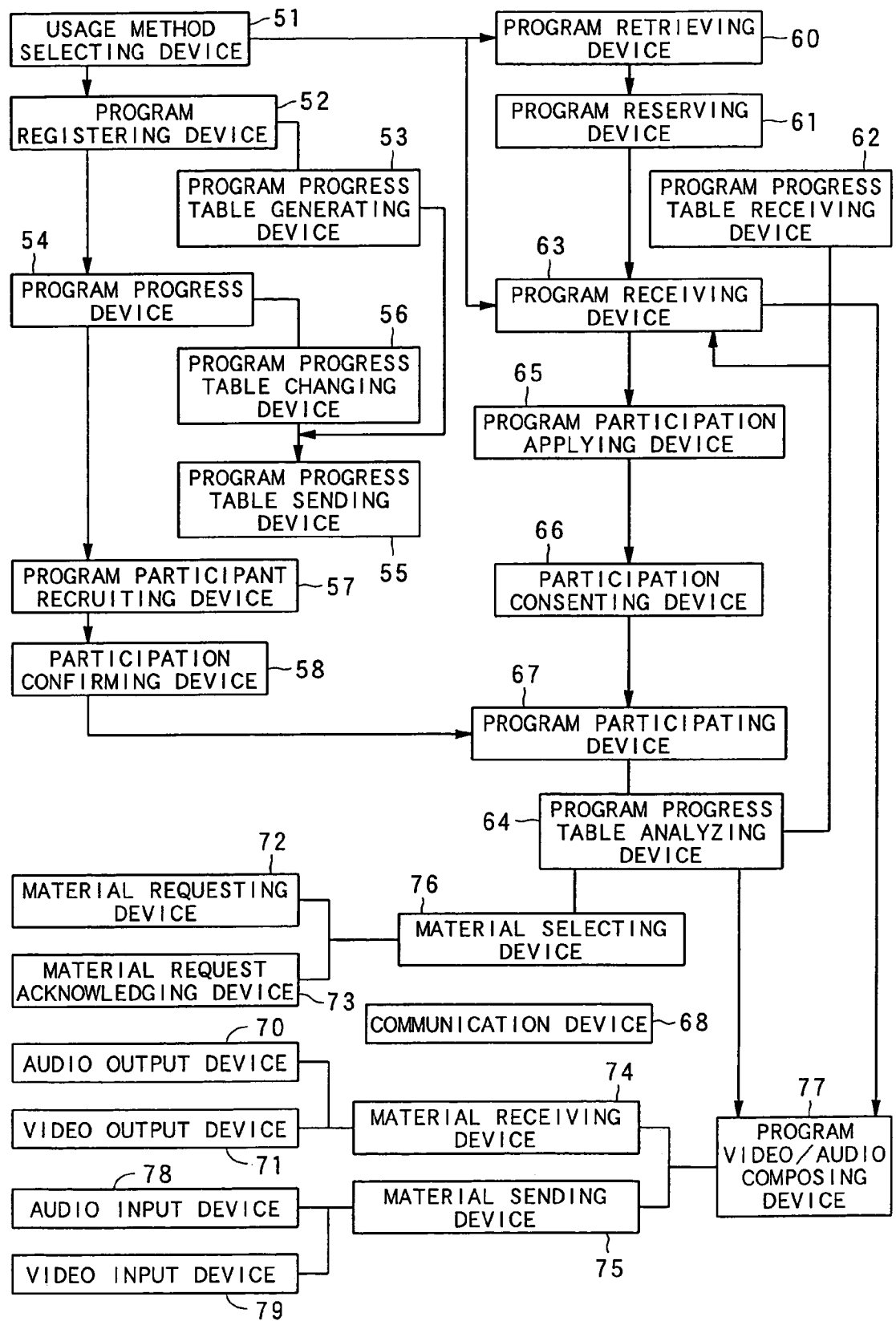
FIG. 4 is a block diagram of the function of the participation program communication apparatus used in the two-way broadcasting system according to the present invention.

FIG. 4 is a block diagram showing the operational function of the participation program communication apparatus 14 according to the present invention. A description will be given below of the program producing function and the program participating function. First the participation program communication apparatus 14 has an usage method selecting device 51 by which a user of the participation program communication apparatus 14 can choose between being a program sender which registers, produces and sends a program and being a program viewer which views a provided program and participates in the program according to the progress of the program.

The usage method selecting device 51 includes: a program registering device 52 having a program progress table generating device 53 used by a program sender; a program progress device 54 having a program progress table changing device 56 used by a program sender during the start of a program broadcast and a program progress table sending device 55; a program participant recruiting device 57 by which a program sender prompts viewers of another program to participate in the program; and a participation confirming device 58 by which a program sender confirms the intention to participate.

In addition, the usage method selecting device 51 has a program retrieving device 60 used by a program receiver and a program reserving device 61 for registering the result of retrieving a program. According to the system of the present invention, if a program broadcast has already started when a user begins to use the participation program communication apparatus 14, then the program is received by a program receiving device 63 connected to the usage method selecting device 51. To receive a program, a program progress table recorded in advance into the participation program communication apparatus 14 is taken out and analyzed by a program progress table analyzing device 64, so that a program video/audio composing device 77 composes the program.

Using a program progress table receiving device 62, the program progress table analyzing device 64 constantly obtains a renewed program progress table to modify the program receiving device 63, thereby controlling the progress of a program. The program progress table analyzing device 64 informs a material selecting device 76 of the material to be used. Then, using a material requesting device 72 and a material request acknowledging device 73, the material selecting device 76 communicates with the material server 18 via a communication device 68 to request material data to be used.

In the program video/audio composing device 77, the material data sent from the material server is received by a material receiving device 74 via the communication device 68. On the other hand, video and audio signals of a user of the participation program communication apparatus 14, which signals are input by a video input device 79 and an audio input device 78 corresponding to the video camera 39 and the microphone 46 shown in FIG. 2, are sent via the communication device 68 to another participation program communication apparatus 14 by a material data sending device 75 and at the same time input to the material receiving device 74, so that the video and audio signals are output as the image and voice through a video output device 71 and an audio output device 70 corresponding to the TV monitor 36 and the loudspeaker 43 shown in FIG. 1. Accordingly, a program is realized according to the change of images and sounds of a program, based on a program progress table.

In program production, in order to generate a program progress table in advance to register a program, a program sender obtains program progress table model data from the information management server 12 by use of the program registering device 52. After generation of the program progress table by use of the program progress table generating device 53, the program progress table is sent to the information management server 12 by the program progress table sending device 55. After the program broadcast has started, the program sender controls the progress of the program by the program progress device 54; the program sender controls the program progress table by use of the program progress device 54. Specifically, the program sender changes the program progress table by the program progress table changing device 56 as required and registers the resulting program progress table with the information management server 12 by use of the program progress table sending device 55.

In the program progress device 54, a program sender recruits participants from program viewers by use of the program participant recruiting device 57. On the other hand, a program receiver who views the program by the program receiving device 63 receives a signal sent by the program sender from the program participant recruiting device 57 by use of a program participation applying device 65 and sends a response signal by use of a participation consenting device 66. The program sender receives the response signal from the program viewer sent by the participation consenting device 66 and confirms the participation by use of the participation confirming device 58, so that a program participating device 67 enables the program viewer to participate. The program participating device 67 controls the program progress table analyzing device 64 to thereby compose the images and sound of the program in which the program viewer participates.

According to the devices described above, the participation program communication apparatus 14 according to the present invention sends and receives a program in which viewers can participate.

Next, a description will be given of the information management server 12 which communicates with the participation program communication apparatus 14 to control a program. FIG. 5 is a block diagram showing the function of the information management server 12.

The information management server 12 having a program registering device 80 registers a program progress table sent by the program progress table sending device 55 of the participation program communication apparatus 14 shown in FIG. 4. On the other hand, the information management server 12 sends program list information by use of a program index sending device 81 in response to a program displaying request from the program retrieving device 60 for retrieving a program to be received by the participation program communication apparatus 14.

In response to a program reserving operation performed by the program reserving device 61 of the participation program communication apparatus 14, the information management server 12 takes out the corresponding program progress table from the program DB 201 and sends the program progress table to the participation program communication apparatus 14 by use of a program progress table sending/receiving device 82. In addition, the information management server 12 registers users hoping to view the program with the participant list DB 204 by use of a viewer registering device 83.

Furthermore, when a program starts according to an operation by the program sender, the information management server 12 using a viewer information sending device 84 takes out viewer information regarding the program from the participant list DB 204 and sends the viewer information to the participation program communication apparatus 14 of the program sender. The participation program communication apparatus 14 displays the participant list by use of the program progress device 54 and recruits program participants by use of the program participant recruiting device 57.

The information management server 12 has a program progress table model sending device 86 used at the time when the participation program communication apparatus 14 generates a program progress table. The program progress table model, separately produced, is registered with the program progress table model DB 202 by a program progress table model registering device 85 and output by a request from the participation program communication apparatus 14.

The information management server 12 has a material index list sending device 88 required for producing a program progress table. According to this function, it is possible to send to the participation program communication apparatus 14 the material index information required for program production, which is registered in advance with the material index list DB 203, so that the material index information is used for program production. The material index information is received from the material server 18 by use of a material index receiving device 87 and registered with the material index list DB 203.

A communication network connecting device 89, which is connected to the program index sending device 81, the program progress table sending/receiving device 82, the viewer information sending device 84, the program progress table model sending device 86, the material index list sending device 88 and the material index receiving device 87, performs the sending and receiving of signals to/from the communication network 10.

Next, the function of the material server 18 will be explained. FIG. 6 is a block diagram showing the function of the material server 18.

The material server 18 having a material data registering device 91 for registering materials used for program production registers material data with the material DB 206. In response to a signal from the material requesting device 72 of the participation program communication apparatus 14, the material server 18 sends a material request acknowledging signal and at the same time sends material data by use of a material data sending device 92. When receiving the material request acknowledging signal, the participation program communication apparatus 14 receives the material data by use of the material receiving device 74 to compose a program. Aside from sending stored material data recorded in advance, the material server 18 may register the starting information of video stream materials such as a live video image with the material DB 206, so that video and audio signals captured in real time can be sent in response to a request from the material requesting device 72 of the participation program communication apparatus 14.

The material server 18 has a material index information registering device 93 used for registering material index information indicating the outline and related information of a material at the time when the material data registering device 91 registers the material. The material index information is registered with the material index DB 207 and at the same time sent to the information management server 12 by a material index information sending device 94.

A communication network connecting device 95 sends information from the material data sending device 92 and the material index information sending device 94 to the communication network 10. According to the configuration described above, there is realized the two-way broadcasting system enabling a viewer to produce and send a program. Next, exemplary operations of the apparatuses used in the system according to the present invention will be described with reference to the flowcharts and exemplary windows displayed on a screen.

Figure 7:
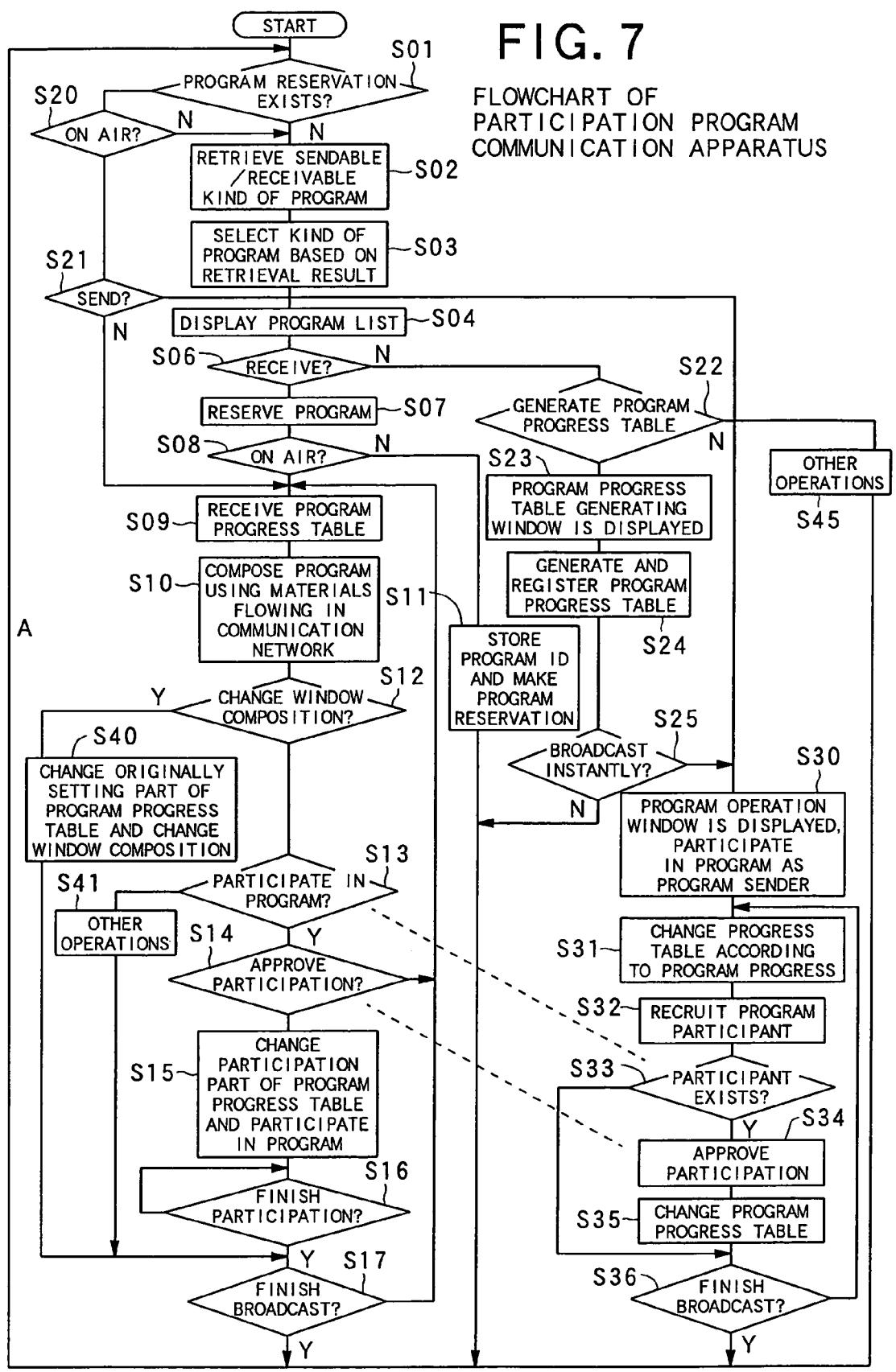
FIG. 7 is a flowchart of the participation program communication apparatus used in the two-way broadcasting system according to the present invention.
Figure 10:
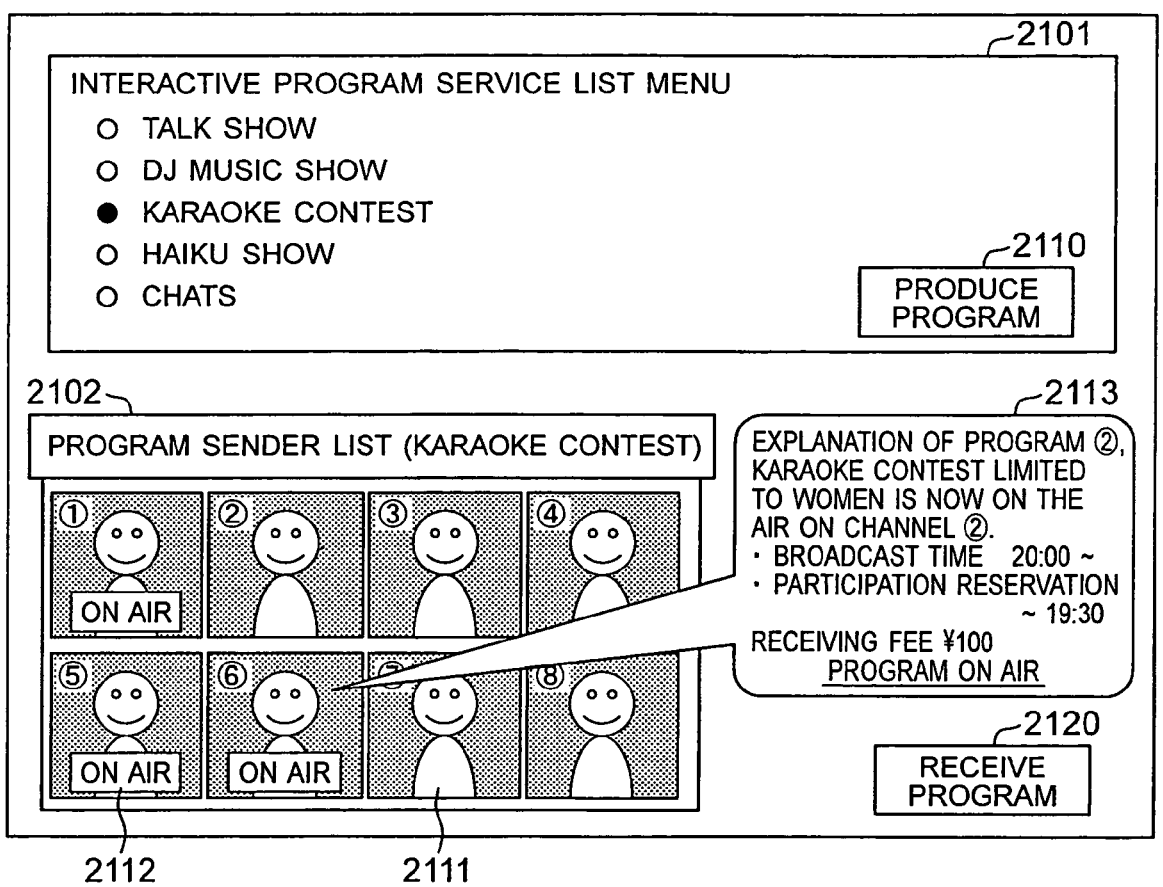
FIG. 10 is an exemplary window displayed at the time when the operation of the participation program communication apparatus used in the two-way broadcasting system according to the present invention starts.

FIG. 7 is a flowchart explaining the operation of the participation program communication apparatus 14. FIG. 10 is an exemplary operational window displayed on the TV monitor 36 at the time when the operation of the participation program communication apparatus 14 starts. An exemplary program selecting process of the participation program communication apparatus 14 will be described with reference to these drawings. First the participation program communication apparatus 14 decides whether a program reservation exists (S01). If so, then the flow proceeds to a process S20 and then a decision is made whether the user is a program sender or a viewer (S21). If a program is to be sent, a program operation image 100 is displayed (S30). If a program is to be received, the program progress table 200 is received and a program receiving image 210 is displayed. In the process S01, if there is no program receiving reservation, the user retrieves the kinds of sendable or receivable programs from the information management server 12 on the screen of the TV monitor 36 of the participation program communication apparatus 14 (S02), as shown in FIG. 10. As a result of retrieving programs, the kinds of sendable or receivable programs are displayed on an interactive program service listing menu 2101, allowing the user to select a desired service (S03). Consequently, a program (sender) list 2102 is displayed on the screen of the participation program communication apparatus 14 (S04).

The user decides whether to receive each program (S06) If so, then the user selects a program and operates a program receiving button 2120 to thereby proceed to a program receiving and reserving process (S07). When a program is selected, a description 2113 of the corresponding program is displayed. Thus, the user can get the details of the program. FIG. 10 shows an exemplary image displayed at the time when a karaoke contest program is selected. If a program is to be sent, a program production button 2110 is operated so as to proceed to a program producing process (S22).

Next, an exemplary program receiving and reserving process of the participation program communication apparatus 14 will be described with reference to the flowchart shown in FIG. 7. Viewing a list of programs displayed on the screen of the participation program communication apparatus 14, the user can select a desired program from the list by use of a program selecting device 2111 and make a program receiving reservation by use of the program receiving device 2120. Then, the participation program communication apparatus 14 decides whether the program is on the air (S08). When a program broadcast indicating device 2112 indicates that the program is on the air, the flow proceeds to a process S09 in which the program progress table 200 is received from the information management server 12. When the selected program is not on the air, a program ID obtained from the program progress table is stored and a program receiving reservation is made (S11).

Figure 12:
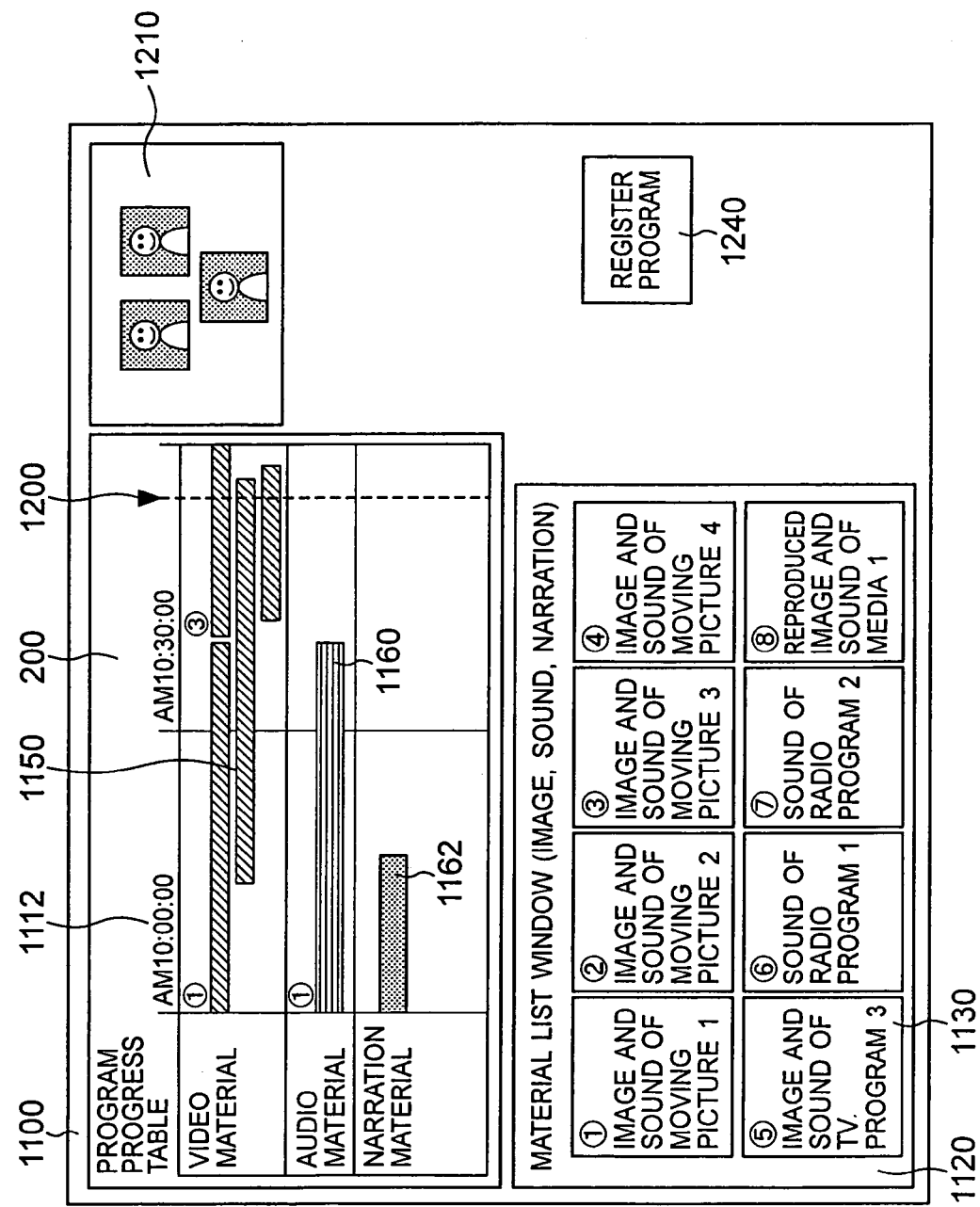
FIG. 12 is an exemplary window displayed at the time when a program progress table is generated by the participation program communication apparatus used in the two-way broadcasting system according to the present invention.

Next, the process of generating, by a user, a program progress table will be described with reference to FIGS. 7 and 12. First, when the user selects a process of generating a program progress table by means of the participation program communication apparatus 14 (S22), a program progress table generating window 1100 is displayed (S23). The program progress table generating window 1100 included a program progress table 200 indicating how the program progresses and a material listing window 1120 where such materials as an image, sound and narration are indicated. The material information displayed in the material listing window 1120 is received as the material index information from the information management server 12 via the communication network 10. By use of a material selecting device 1130, a program sender selects such materials as an image, sound or narration used as components of a program to be sent from the material listing window 1120, so that the selected materials are represented by bars 1150, 1160 and 1162 in the program progress table 200.

In this case, the time when each material is used can be confirmed by use of a time display device 1112 displayed in the program progress table 200. While performing the editing in the program progress table generating window, a program sender can reproduce an image, sound or narration from any given time by use of an editing-time indicating device 1200 and confirm the edited image contents by use of an edited-image displaying device 1210.

After completing the generation of the program progress table, the user registers the program progress table 200 with the information management server 12 by use of a program registering device 1240 (S24). Then, the information management server 12 decides whether the registered program comes on the air instantly (S25). If so, then a program operating window is displayed in the participation program communication apparatus 14 of the program sender (S30).

Figure 14:
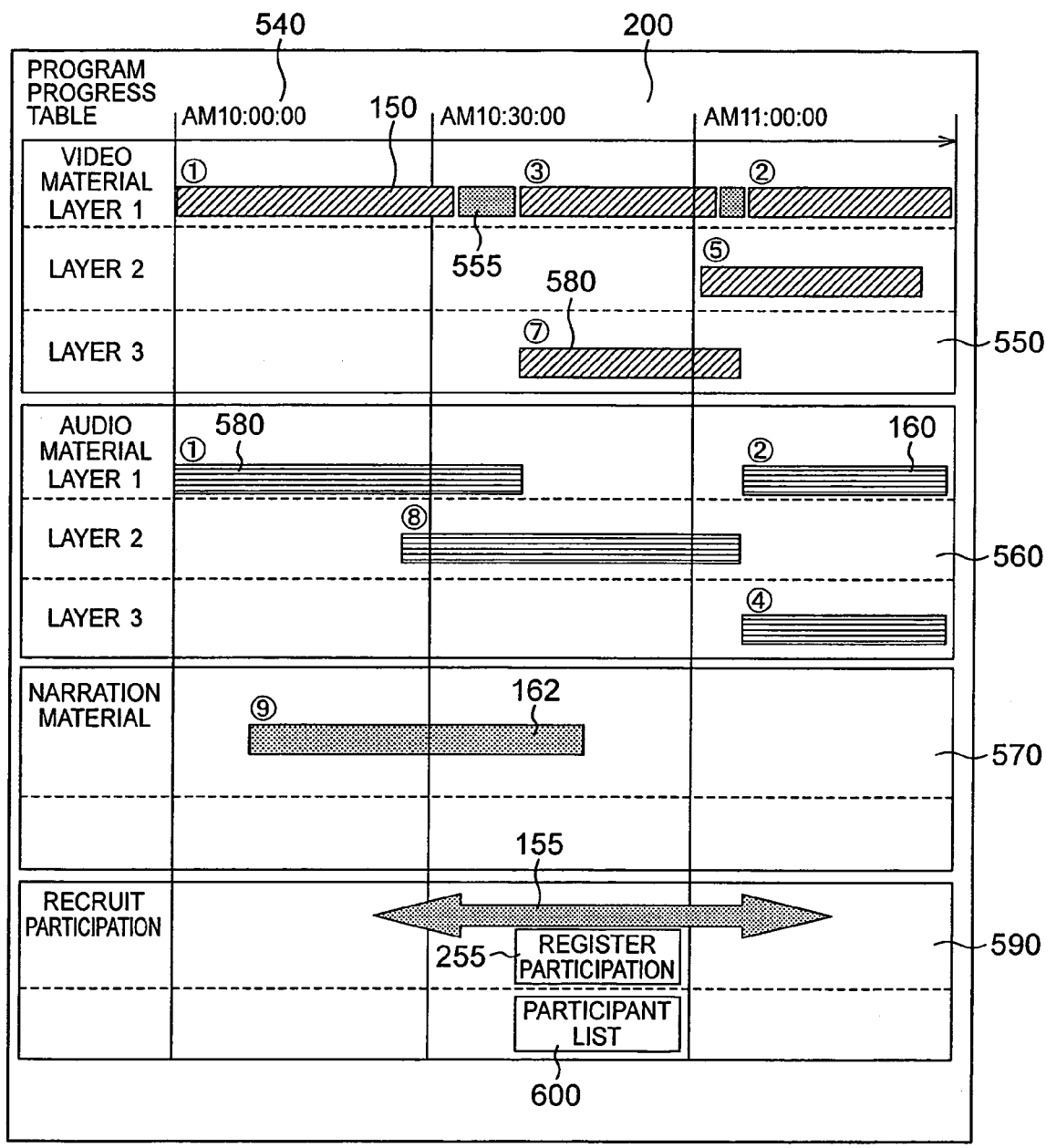
FIG. 14 is a diagram showing an exemplary composition of the program progress table used in the two-way broadcasting system according to the present invention.
Figure 15:
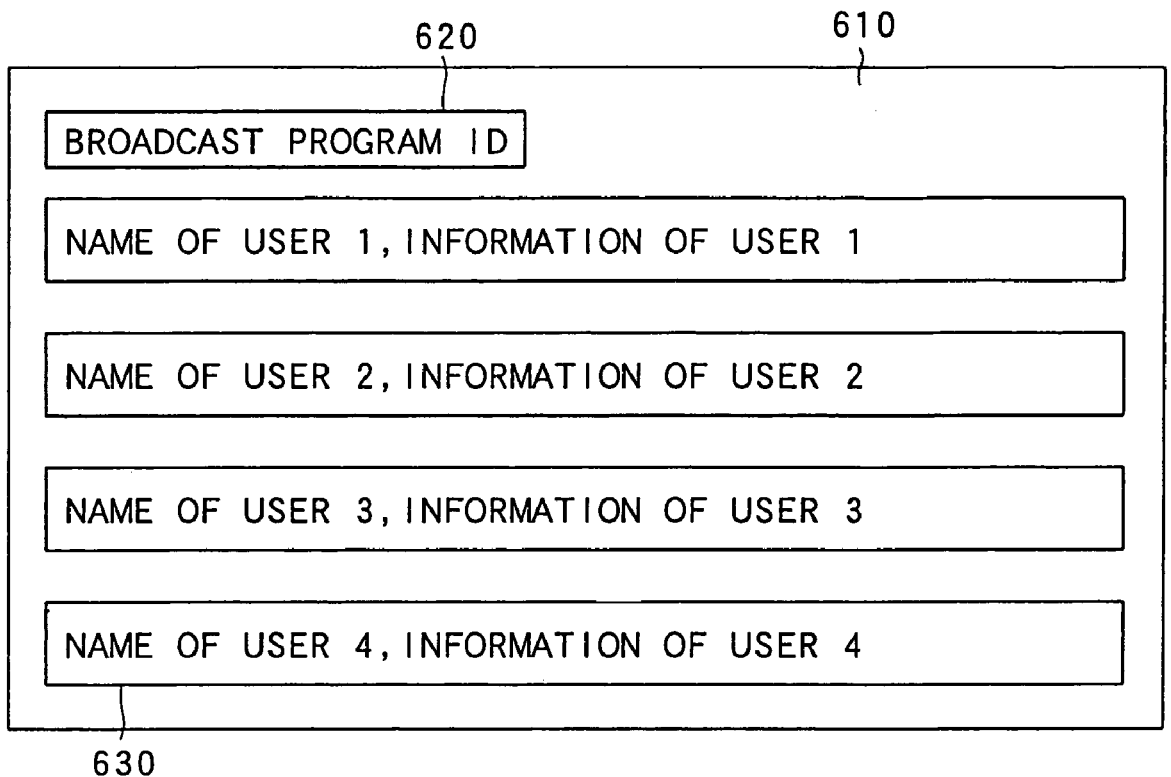
FIG. 15 is a diagram showing an exemplary composition of a registered participant list used in the two-way broadcasting system according to the present invention.

An embodiment of the process of receiving and viewing, by a user, a program will be described hereinafter with reference to FIG. 7 (flowchart) as well as FIGS. 11, 14 and 15. First a user receives the program progress table 200 which another user has produced and registered (S09), from the information management server 12. The program progress table includes a video material time line area 550, an audio material time line area 560, a narration material time line area 570 and a time line area 590 in which a program sender indicates a participant recruiting period of time. Video, audio and narrational materials are represented by bars 150, 160, 162 and 155 on each time line area, respectively.

Figure 11:
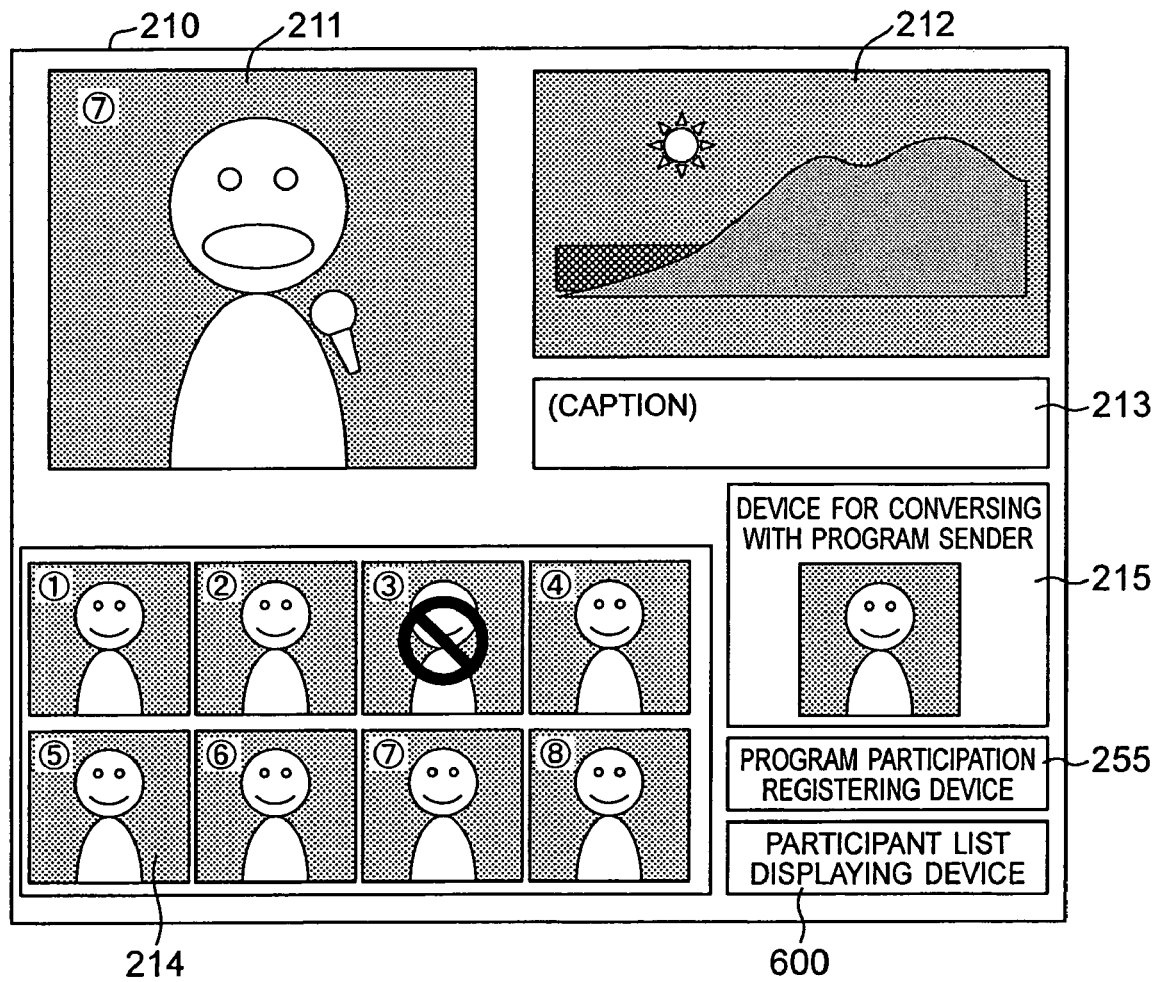
FIG. 11 is an exemplary window displayed at the time when the participation program communication apparatus used in the two-way broadcasting system according to the present invention is receiving a program.

When the program progress table 200 is received, the participation program communication apparatus 14 on the user side firstly acquires each material which exists in the communication network to thereby compose a program (S10), as shown in FIG. 11. FIG. 11 shows an exemplary received program window of a karaoke show, in which a singer image 211, an image for the song 212 and a caption 213 are shown. In addition, a program participants list 214, a program participation registering device 255 and a program sender conversing device 215 are displayed. The voice of a singer and the sound of performance are also output. The user decides whether to change the window composition of the program according to the program progress table 200 (S12). If so, then the user can change the window composition by adding or modifying a separately setting part of the program progress table 200 (S40). Specifically, it is possible to perform enlargement of the singer image 211, elimination of the caption 213 and the like. Afterwards, the user decides whether to finish receiving programs (S17). If not, then the user again receives the program progress table 200 (S09) and composes a program by acquiring materials (S10).

If the program progress table window is not changed, when participants of the program are being recruited in the program progress table 200, the program participation registering device 255 is displayed as shown in FIG. 11 to enable the user to perform a program participating operation. Thus, the user can inform of the program participation by use of the program participation registering device 255 (S13). If the user does not wish to participate in the program, the user performs other operations (S41), receives the program progress table 200 until the program is finished (S17), and repeats similar operations. On the other hand, when the user wishes to participate in the program, the user awaits a program participation approval from the program sender (S14). When the program participation is approved, the name of the user is added to a registered participant list 610 recorded in the information management server 12 to enable the user to participate in the program; the user name is displayed in the program participants list 214 of FIG. 11 (S15). Before participating, the user can converse with the program sender by use of the program sender conversing device 215. The user on the receiving side can display the registered participant list 610 by use of a registered participant list displaying device 600. Recorded in the registered participant list 610 are program specifying information (characters, symbols and numerals) 620 and registered participant information 630.

A user which has received the program participation approval continues to participate in the program (S16); even after finishing participating in the program, the user can receive the program until the program broadcast is finished (S17).

Figure 13:
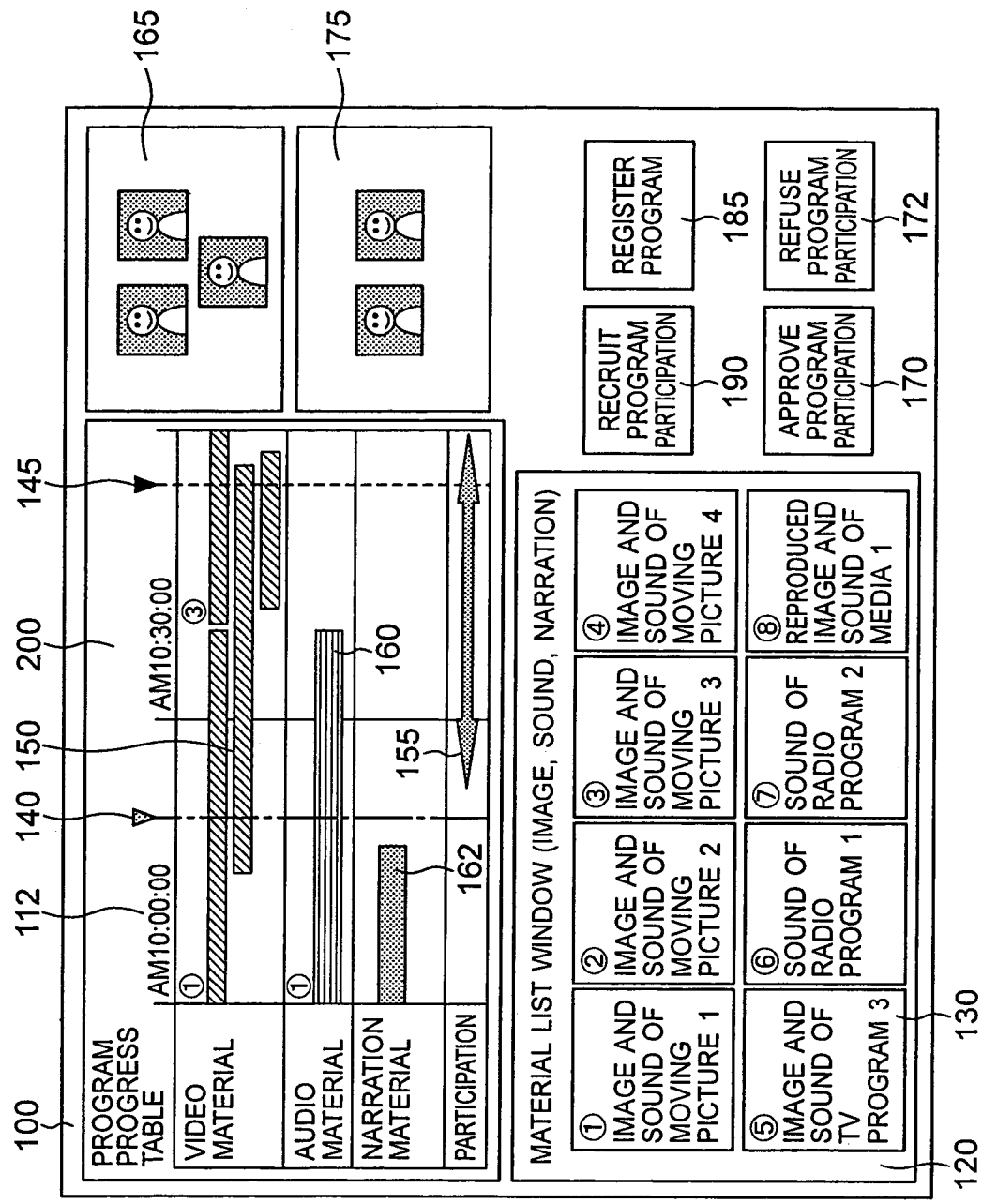
FIG. 13 is an exemplary window displayed at the time when a program is on air by use of the participation program communication apparatus used in the two-way broadcasting system according to the present invention.

An exemplary operational process performed by a program sender will be described hereinafter with reference to FIG. 13 and the flowchart showing the main operation of FIG. 7. First a program operation image 100 is displayed on a screen for a user which has performed an operation allowing the user to become a program sender, thereby enabling the user to participate in the program as the program sender (S30). The program operation image 100 includes the program progress table 200 indicating how the program progresses and a material listing window 120 where such materials as an image, sound and narration are indicated. According to progress of the program, by use of a material selecting device 130, the program sender selects such materials as an image, sound or narration used as components of a program to be sent from the material listing window 120, so that the selected materials are represented by bars 150, 160 and 162 in the program progress table 200.

In this case, the time when each material is used can be confirmed by use of a time display device 112 displayed in the program progress table 200. The current time of broadcasting is indicated by a broadcast time indicating device 140. The image which is on the air can be confirmed by an on-air image displaying device 175. While performing the editing in the program operation window, a program sender can reproduce an image, sound or narration from any given time by use of an editing-time indicating device 145 and confirm the edited contents by use of an edited-image displaying device 165.

The program sender changes the program progress table 200 according to the progress of the program (S31), and then registers the resulting program progress table 200 with the information management server 12 by use of a program registering device 185. Thereafter, the program sender can recruit users which can participate in the program by use of a program participant recruiting device 190 (S32). The period of time during which the participants are recruited can be displayed in the program progress table 200 by use of a participant recruiting-period indicating device 155. The participation program communication apparatus 14 decides whether there is a participant from users (S33). If so, then the image, sound, narration, etc. of the user wishing to participate in the program are displayed in the material listing window 120 where such materials as an image, sound or narration are indicated. After selecting the materials by use of the material selecting device 130, the program sender can approve or refuse program participation with respect to another user by use of a program participation approving device 170 or a program participation refusing device 172 (S34). Depending on the participants, the program sender again changes the program progress table and registers it with the information management server 12 by use of the program registering device 185 (S35). When there is no program participant, the program sender can decide whether to finish the broadcast according to the broadcast time, etc. (S36). If not, then the program sender can change the program progress table in accordance with the progress of the program and register the table (S31). Thereafter, this process is repeated.

Figure 8:
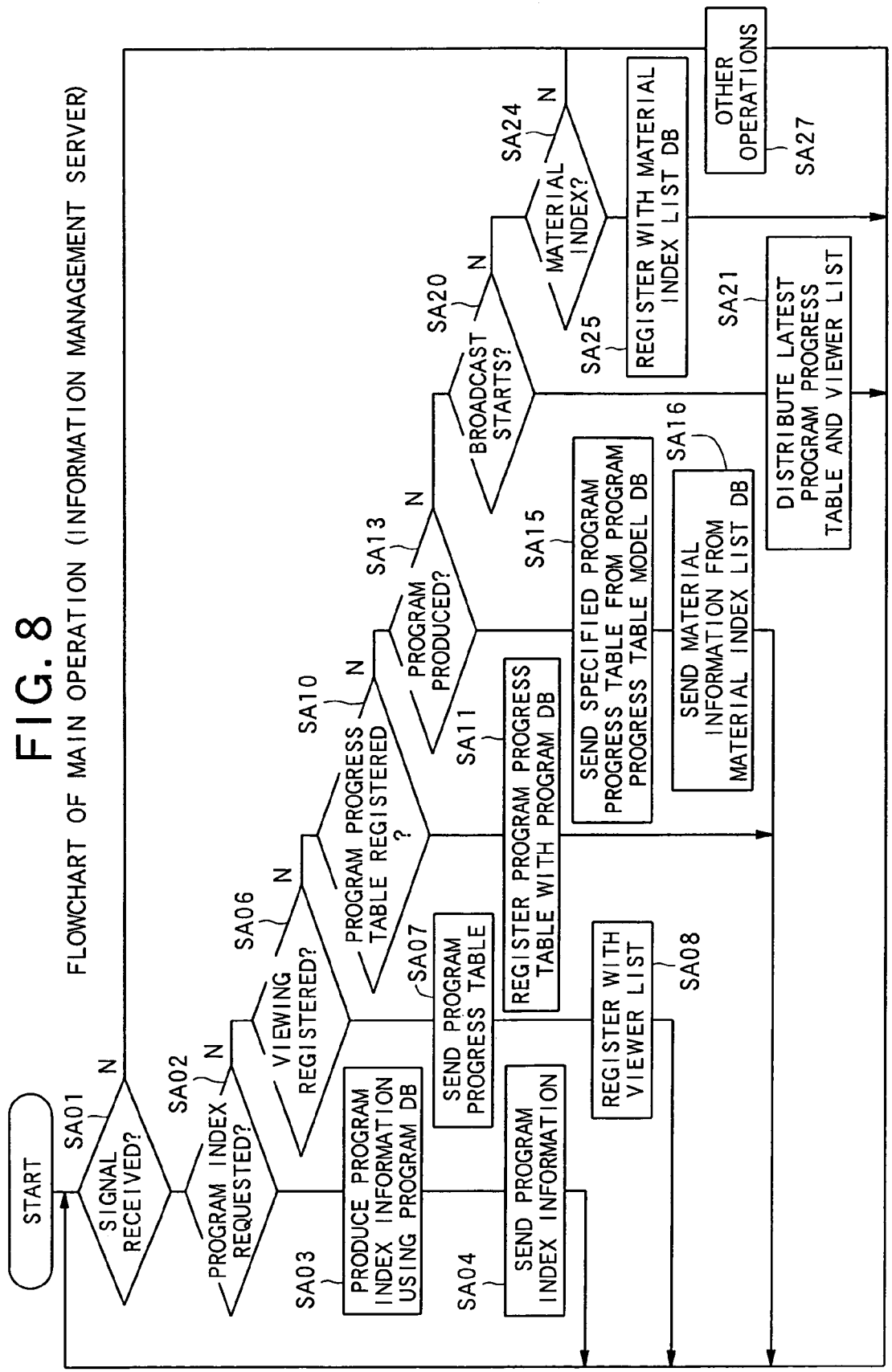
FIG. 8 is a flowchart of the information management server used in the two-way broadcasting system according to the present invention.

FIG. 8 is a flowchart showing an exemplary operation of the information management server 12. The operation of the information management server 12 will be described below.

The information management server 12 monitors and receives signals from the communication network 10 (SA01) If there is no signal received, other operations are executed (SA27) and then signals from the communication network 10 are again monitored (SA01). If there is a signal received, the server decides whether the received signal is a program index request (SA02). The program index request contains the kind-of-program information which has been specified by the process S03 of the participation program communication apparatus 14 shown in the flowchart of FIG. 7. Using this information, the information management server 12 produces program index information based on the program progress table 200 stored in the program DB 201. The program index information thus produced is sent the participation program communication apparatus 14 (SA04). The participation program communication apparatus 14 receives the program index information, so that a program list is displayed in the process S04 shown in FIG. 7.

If a program index request is not received (SA02), a decision is made whether a viewing registering signal is received (SA06). When a viewing registering signal containing information of a program selected by the process S07 shown in the flowchart (FIG. 7) of the participation program communication apparatus 14 is received, the information management server 12 sends the program progress table 200 taken out from the program DB 201 to the participation program communication apparatus 14 (SA07) and takes out viewer information from the viewing registering signal to register the information with the participant list DB 204 (SA08). On the other hand, when receiving the program progress table 200, the participation program communication apparatus 14 decides whether the program is on the air through the process S08 shown in FIG. 7. If so, then the apparatus receives the program progress table 200 through the process S09. If not, then the apparatus takes out a program ID from the program progress table 200 and records the ID as a program reservation.

In addition, the information management server 12 decides whether a received signal is the program progress table registration request (SA10). Referring to the flowchart (FIG. 7) of the participation program communication apparatus 14, the program progress table 200 registration request is sent to the information management server 12 (S24) with which there is registered the program progress table 200 in which the contents of the program progress determined by a program producer are described. When receiving the request, the information management server 12 registers the received program progress table 200 with the program DB 201 (SA11).

In addition, the information management server 12 decides whether a received signal is a program production request (SA13). Referring to the flowchart (FIG. 7) of the participation program communication apparatus 14, the program production request is made to the information management server 12 when after making a decision on whether to produce a program (S22), the program producer performs the program progress table 200 producing operation by displaying the program progress table 200 producing window (S23). When receiving the program production request, the information management server 12 takes out program progress table model data corresponding to the kind of the selected program from the program progress table model DB 202 and sends the data to the participation program communication apparatus 14 (SA15). Then, the information management server 12 takes out from the material index list DB 203 the material index list data used in the program progress table 200 generation (S24 in the flowchart (FIG. 7) of the participation program communication apparatus 14) and used for determining required materials, and sends the data to the participation program communication apparatus 14 (SA16).

In addition, the information management server 12 decides whether a program broadcast starts (SA20) and receives a program receiving start signal from the participation program communication apparatus 14. When receiving the signal from the participation program communication apparatus 14, the information management server 12 sends the latest program progress table 200 and a viewer list, obtained from the program DB 201 and the participant list DB 204, respectively, to the participation program communication apparatuses 14 (SA21). Referring to the flowchart (FIG. 7) of the participation program communication apparatus 14, such information is received by the processes S09 and S31 to compose the program.

On the other hand, the information management server 12 decides whether a received signal is a material index registering signal from the material server 18 which provides program materials (SA24). If so, then the information management server 12 registers the signal contents with the material index list DB 203 (SA25). In a process SA16, the material index information thus registered is sent to the participation program communication apparatus 14 for the purpose of program production.

The operation of the information management server 12 described above may be performed by a plurality of servers or a specified participation program communication apparatus 14.

Figure 9:
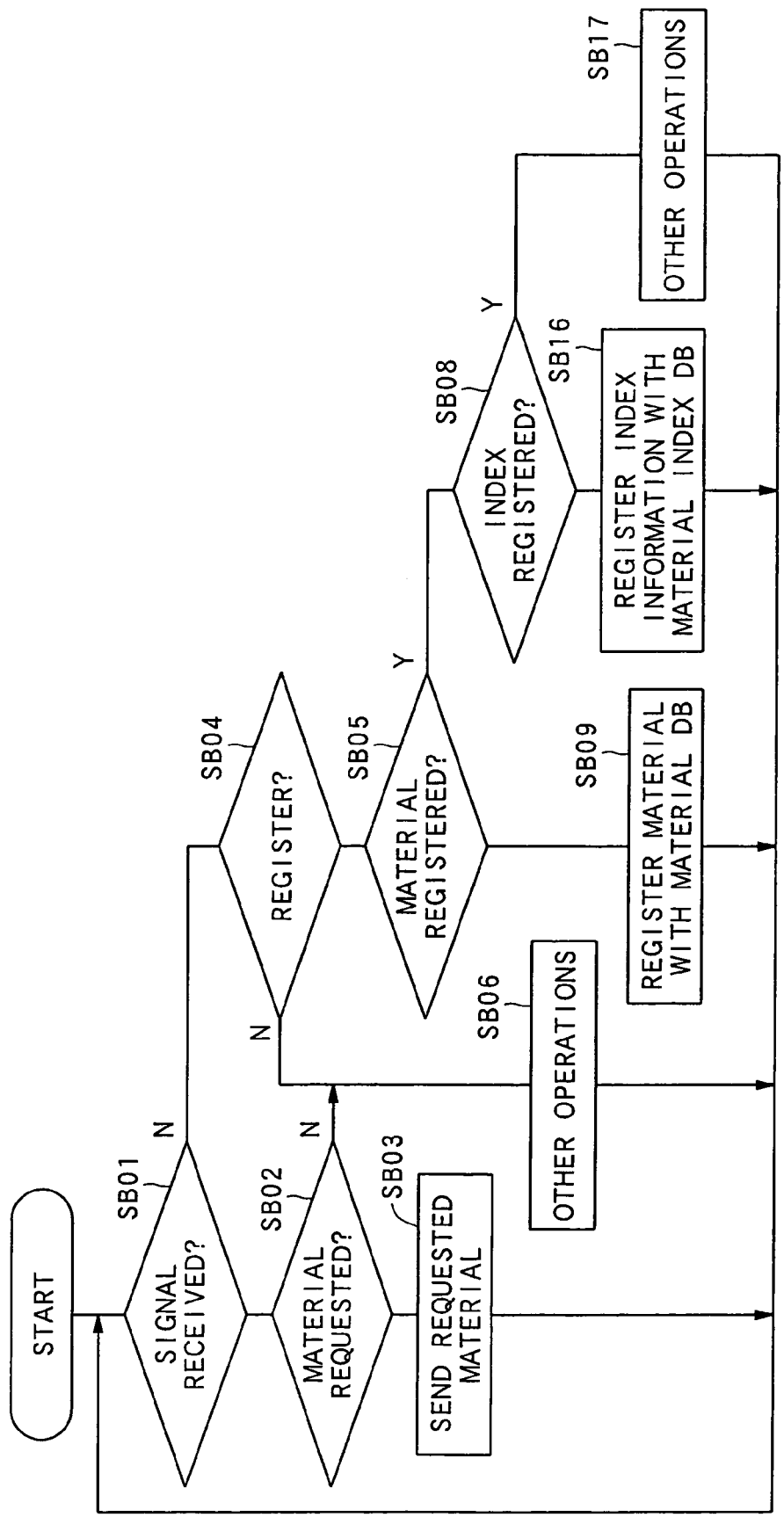
FIG. 9 is a flowchart of the material server used in the two-way broadcasting system according to the present invention.

Next, the operation of the material server 18 will be described with reference to FIG. 9 (flowchart). The material server 18 monitors signals from the communication network 10 and decides whether there exists a received signal (SB01). If not, then a decision is made whether there exists an operation with respect to the server (SB04). On the other hand, if a signal is received, a decision is made whether the received signal is a material sending request from the participation program communication apparatus 14 (SB02). If not, then other operations are confirmed (SB06). On the other hand, if the material sending request is received, the requested material data is sent to the communication network 10 (SB03). The material data thus sent is received by the participation program communication apparatus 14 via the communication network 10 to compose the program.

If a registering operation with respect to the material server 18 is confirmed (SB04), then a decision is made whether the operation is of registering material data or of registering material index information (SB05). In the case of the operation of registering material data, the registered material data is registered with the material DB 206 (SB00).

A decision is made whether it is the material index information registering operation (SB08) and if so, then the material index information is registered with the material index DB 207 (SB16). If not, then other operations are performed (SB17).

In this case, the function of the material server 18 may be added to that of the participation program communication apparatus 14, so that the program can be composed by receiving material data from program viewers.

According to the embodiment described above, there can be realized the two-way broadcasting system allowing a user to produce and send a program. However, those skilled in the art will recognize that modifications to the embodiment described above are possible within the scope of the invention, which is defined in the appended claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-431415 filed on Dec. 25, 2003 including the specification, claims, drawings and summary is incorporated herein by reference in its entirety.

What is claimed is:

1. A program broadcasting system, comprising:
a plurality of communication terminal apparatuses including a first communication terminal apparatus and a second communication terminal apparatus, each of the first and second communication terminal apparatuses being able to be connected to a communication network; and
an information management server, wherein:
the first communication terminal apparatus includes:
 a material index information obtaining device that obtains material index information including locations of a plurality of materials and material outlines indicative of outlines of the materials from the information management server through the communication network, each of the materials includes at least video and audio that are to be used as a component of a program,
 a display device that displays a list screen of the respective material outlines included in the obtained material index information,
 a program progress table generating device that selects a material outline to be used as the component of the program from a plurality of the material outlines displayed in the list screen in accordance with a user instruction, and generates a program progress table that includes material specifying information that specifies material in the communication network indicated by the selected material outline, and
 a registering device that registers the generated program progress table in the information management server,
the second communication terminal apparatus includes:
 a program progress table obtaining device that obtains the registered program progress table from the information management server, and
 an outputting device that obtains material from any of a plurality of the communication terminal apparatuses and a material providing server, each of which stores the material through the communication network in accordance with the material specifying information indicated by the obtained program progress table, and outputs video and audio in accordance with the obtained program progress table, and
the information management server includes a storing device that stores the material index information and the program progress table.

2. A program composing method, comprising:
causing a first communication terminal apparatus to obtain material index information including locations of a plurality of materials and material outlines indicative of outlines of the materials from an information management server, which stores the material index information, through a communication network, each of the materials includes at least video and audio that are to be used as a component of a program;
causing the first communication terminal apparatus to display a list screen of the respective material outlines included in the obtained material index information;
causing the first communication terminal apparatus to select a material outline to be used as the component of the program from a plurality of the material outlines displayed in the list screen in accordance with a user instruction, and generates a program progress table that includes material specifying information that specifies material in the communication network indicated by the selected material outline;
causing the first communication terminal apparatus to register the generated program progress table in the information management server;
causing a second communication terminal apparatus to obtain the registered program progress table from the information management server; and
causing the second communication terminal apparatus to obtain material from any of a plurality of the communication terminal apparatuses and a material providing server, each of which stores the material through the communication network in accordance with the material specifying information indicated by the obtained program progress table, and outputs video and audio in accordance with the obtained program progress table.

3. A computer readable storage medium that stores a set of program instructions executable on a data processing device, the program comprising instructions for:
causing a first communication terminal apparatus to obtain material index information including locations of a plurality of materials and material outlines indicative of outlines of the materials from an information management server, which stores the material index information, through a communication network, each of the materials includes at least video and audio that are to be used as a component of a program;
causing the first communication terminal apparatus to display a list screen of the respective material outlines included in the obtained material index information;
causing the first communication terminal apparatus to select a material outline to be used as the component of the program from a plurality of the material outlines displayed in the list screen in accordance with a user instruction, and generates a program progress table that includes material specifying information that specifies material in the communication network indicated by the selected material outline;
causing the first communication terminal apparatus to register the generated program progress table in the information management server;
causing a second communication terminal apparatus to obtain the registered program progress table from the information management server; and
causing the second communication terminal apparatus to obtain material from any of a plurality of the communication terminal apparatuses and a material providing server, each of which stores the material through the communication network in accordance with the material specifying information indicated by the obtained program progress table, and outputs video and audio in accordance with the obtained program progress table.

* * * * *